United States Patent
Fuse et al.

(10) Patent No.: US 8,144,556 B2
(45) Date of Patent: Mar. 27, 2012

(54) OPTICAL DISC RECORDING APPARATUS AND METHOD, AND COMPUTER PROGRAM

(75) Inventors: Shoji Fuse, Iruma (JP); Junichi Furukawa, Kawasaki (JP); Hiroshi Nishiwaki, Kawasaki (JP); Yoshio Sasaki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 65 days.

(21) Appl. No.: 12/680,374

(22) PCT Filed: Sep. 28, 2007

(86) PCT No.: PCT/JP2007/069011
§ 371 (c)(1),
(2), (4) Date: May 6, 2010

(87) PCT Pub. No.: WO2009/040935
PCT Pub. Date: Apr. 2, 2009

(65) Prior Publication Data
US 2010/0309762 A1    Dec. 9, 2010

(51) Int. Cl.
*G11B 7/00* (2006.01)
(52) U.S. Cl. .................................. 369/47.53; 369/116
(58) Field of Classification Search .............. 369/47.1, 369/47.51, 116, 47.52, 47.53, 47.5, 120, 369/121, 47.27
See application file for complete search history.

(56) References Cited

U.S. PATENT DOCUMENTS

| 7,068,579 B2 * | 6/2006 | Tasaka et al. ............... 369/59.24 |
| 2003/0035355 A1 | 2/2003 | Morishima |
| 2003/0063355 A1 | 4/2003 | Shoji et al. |
| 2005/0068871 A1 | 3/2005 | Weirauch |
| 2005/0099914 A1 | 5/2005 | Shoji et al. |
| 2005/0099915 A1 | 5/2005 | Shoji et al. |
| 2005/0232107 A1 | 10/2005 | Shoji et al. |
| 2007/0019522 A1 | 1/2007 | Shoji et al. |
| 2007/0030778 A1 | 2/2007 | Shoji et al. |

FOREIGN PATENT DOCUMENTS

| JP | 3159454 | 2/2001 |
| JP | 2002-358648 | 12/2002 |
| JP | 2003-059047 | 2/2003 |
| JP | 2005-100614 | 4/2005 |

OTHER PUBLICATIONS

International Search Report, PCT/JP2007/069011, January 8, 2008.

* cited by examiner

*Primary Examiner* — Nabil Hindi
(74) *Attorney, Agent, or Firm* — Young & Thompson

(57) ABSTRACT

An information recording apparatus (1) is provided with: a recording device (102) for recording information onto an information recording medium (100) by irradiating the information recording medium with a recording laser beam (L); a controlling device (103) for recording calibration data onto the information recording medium by using the recording laser beam in which the power is adjusted gradually; and a detecting device (107) for detecting degree of modulation of a reproduction signal after the recording of the calibration data, the recording of the calibration data being ended if the degree of modulation exceeds a predetermined range, an optimum power of the recording laser beam being determined from a jitter amount included in a reproduction signal.

9 Claims, 5 Drawing Sheets

[FIG. 1]
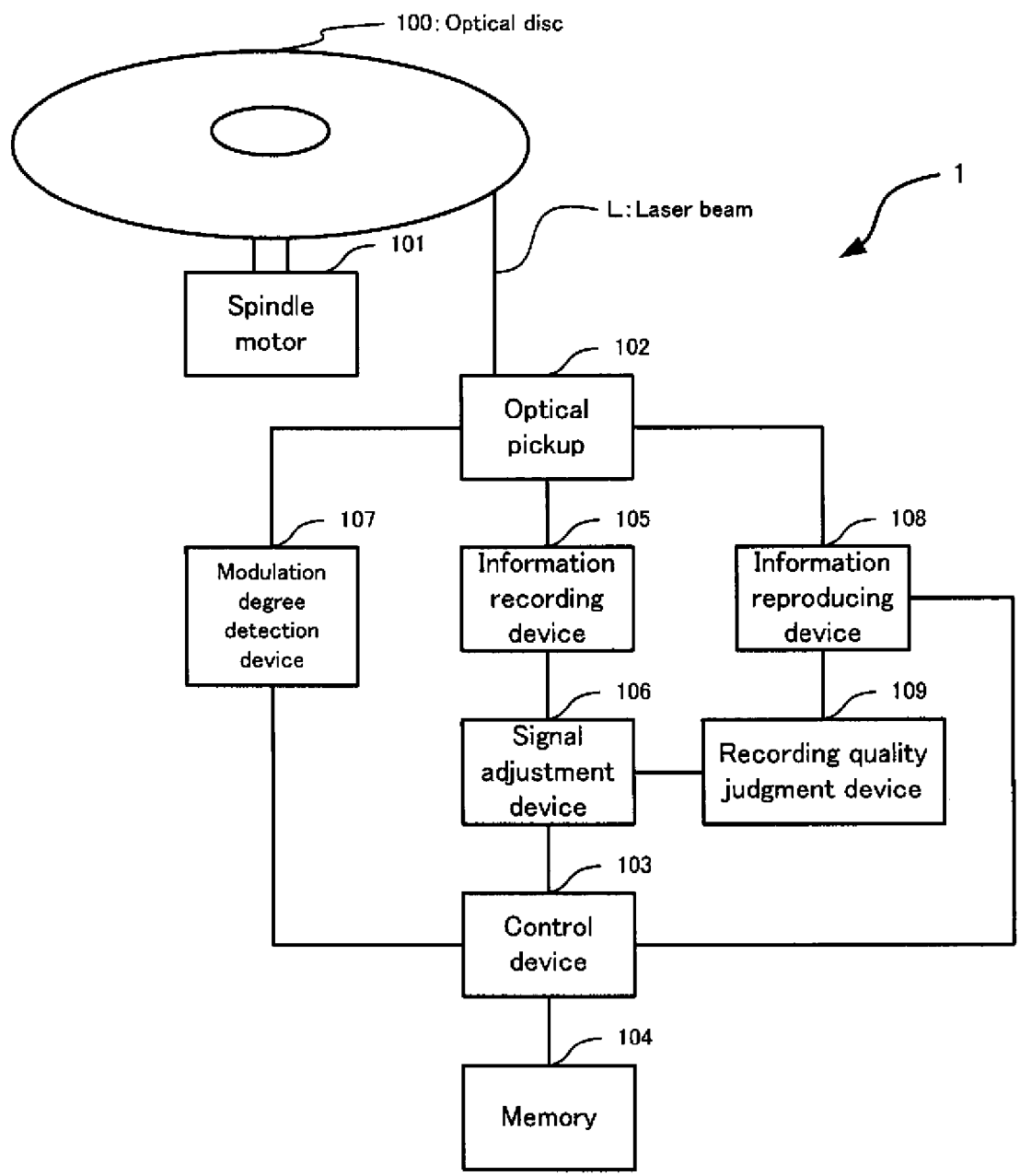

[FIG. 2]
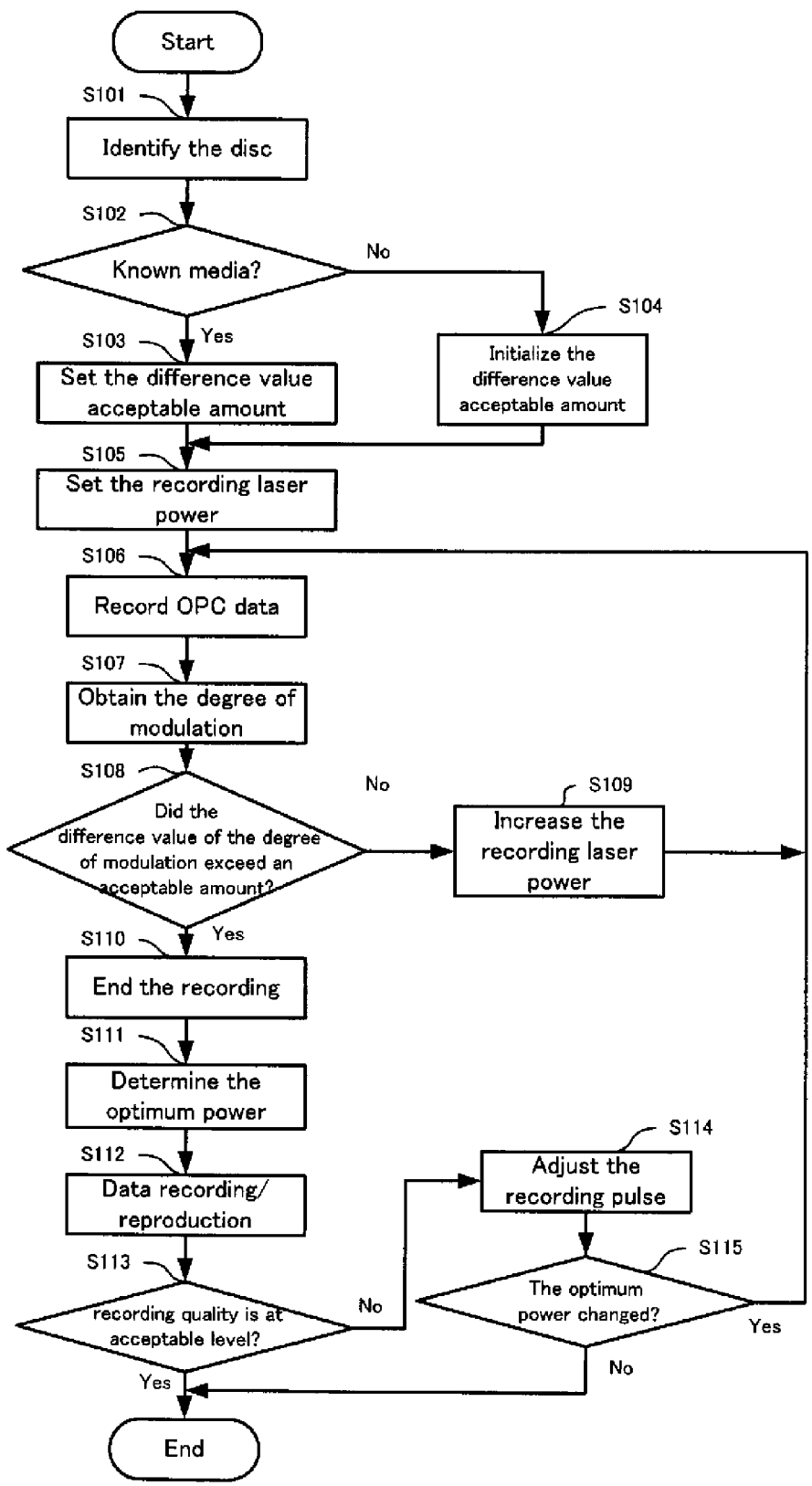

[FIG. 3]
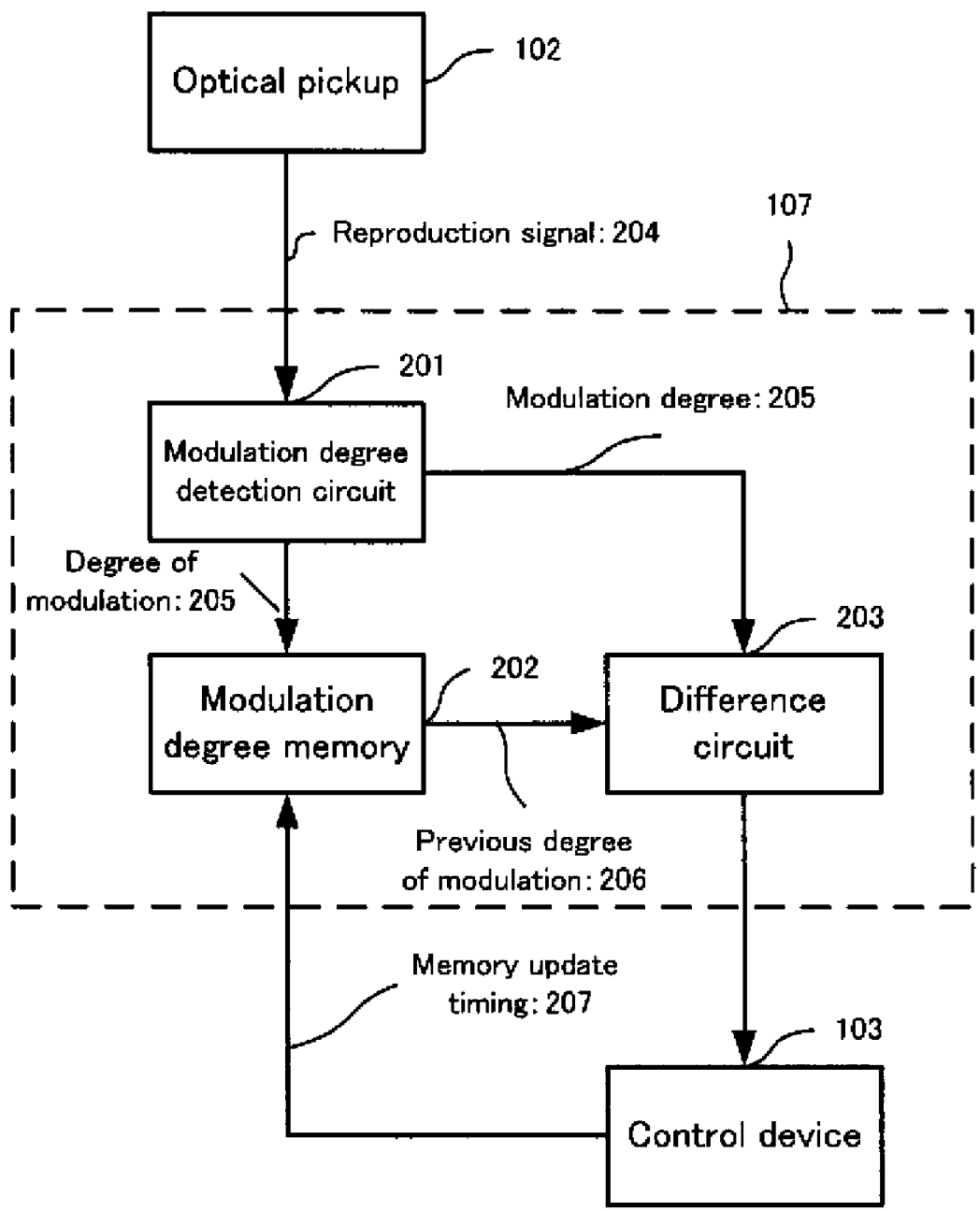

[FIG. 4]
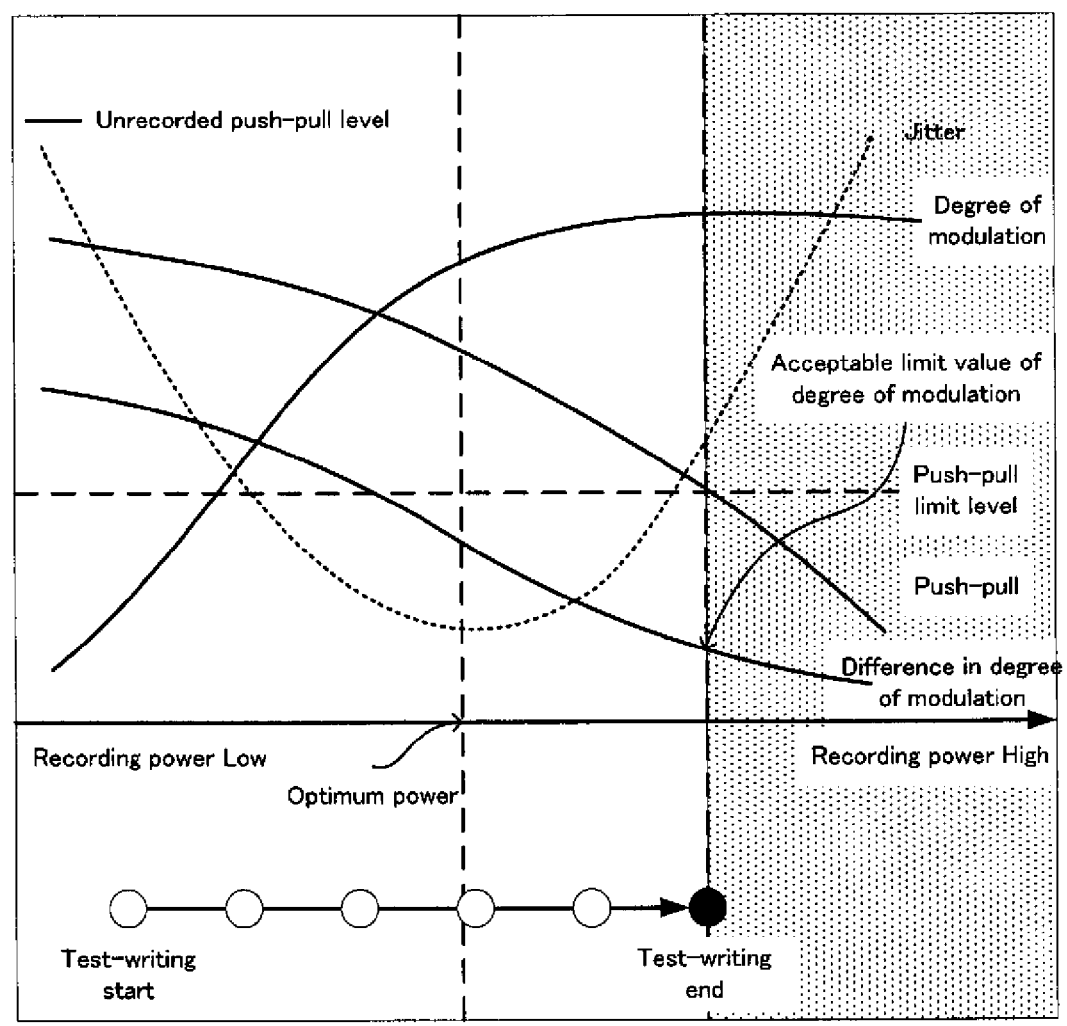

[FIG. 5]
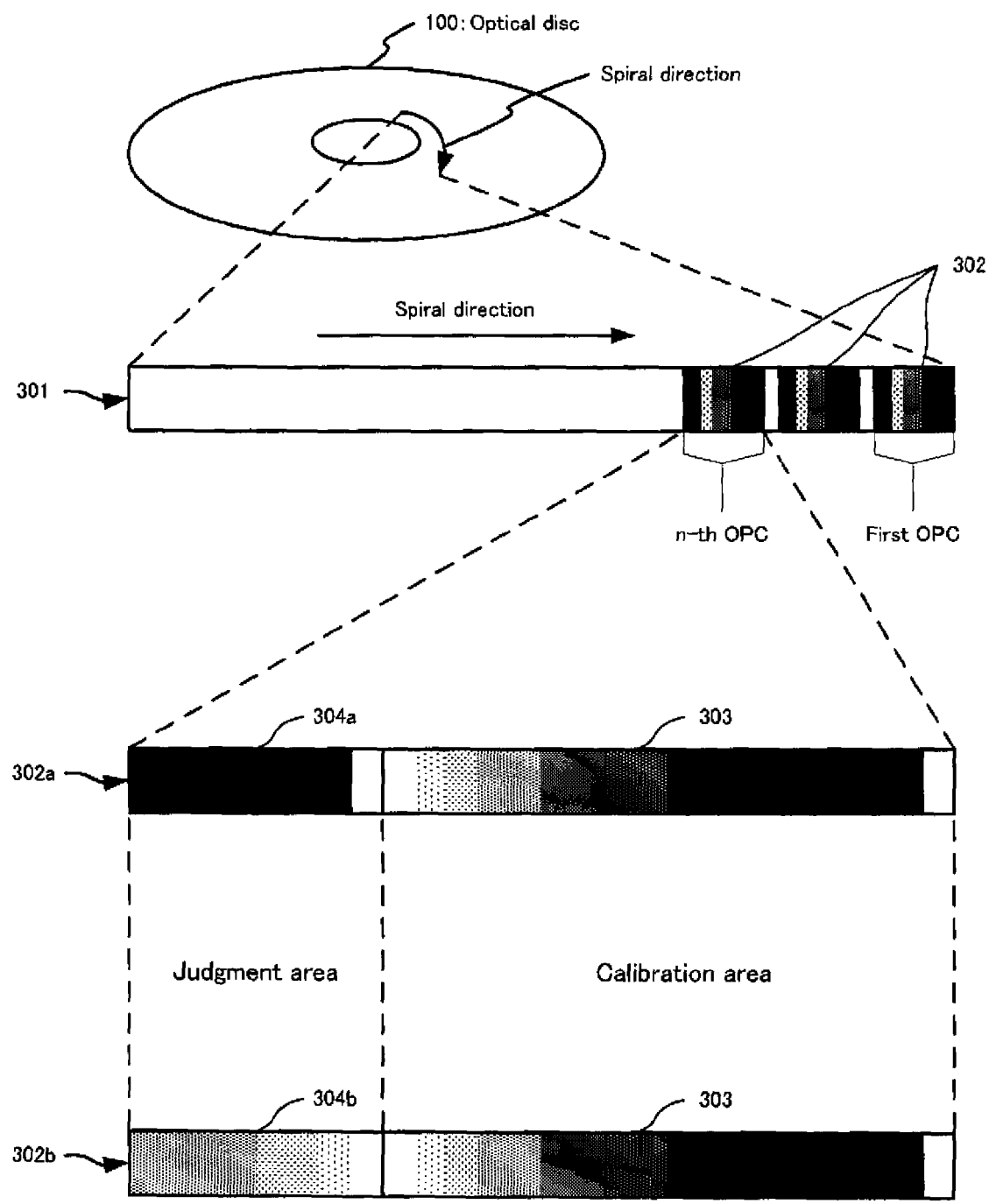

OPTICAL DISC RECORDING APPARATUS AND METHOD, AND COMPUTER PROGRAM

TECHNICAL FIELD

The present invention relates to an information recording apparatus and method, such as a DVD recorder, and a computer program which makes a computer function as the information recording apparatus.

BACKGROUND ART

In an information recording/reproducing apparatus for recording data onto an information recording medium, for example, such as an optical disc, the optimum power of a recording power is set by an OPC (Optimum Power Control) process in accordance with the type of the optical disc, the type of the recording apparatus, a recording speed, or the like. In other words, the recording power is calibrated. This can realize an appropriate recording operation in response to variations in property of the information recording surface of the optical disc, or the like. For example, when the optical disc is loaded and a writing command is inputted, the light intensity of a recording laser beam is changed sequentially and gradually, and OPC data is recorded into an OPC area; namely, a so-called test-writing process is performed. After that, the OPC data recorded in this manner is reproduced, and this reproduction result is judged by a predetermined evaluation criterion to obtain the calibration value (e.g. optimum recording power) of the recording power.

Moreover, the OPC that is simultaneously performed with the actual recording operation (i.e. running OPC) also allows the setting of the optimum recording power associated with the recording laser beam.

Patent document 1: Japanese Patent No. 3159454

DISCLOSURE OF INVENTION

Subject to be Solved by the Invention

However, the upper limit value of the recording power which changes is a fixed value in the calibration process, so that the recording is performed with an excessive recording power that exceeds the detectable limit of a push-pull signal in some recording media to be used, and this may interfere with a system operation, which is technically problematic. Moreover, in an apparatus of such a type that the recording is started with a relatively large recording power as an initial value and that the calibration is performed with the recording power reduced sequentially, not only the upper limit value of the recording power but also the recording power as the initial value likely exceed the detectable limit of the push-pull signal in the first place.

In view of the aforementioned problems, it is therefore an object of the present invention to provide an information recording apparatus and method which can preferably determine the optimum power when the data is recorded onto the information recording medium, such as an optical disc, and a computer program which makes a computer function as the information recording apparatus.

Means for Solving the Subject

The above object of the present invention can be achieved by an information recording apparatus provided with: a recording device for recording information onto an information recording medium by irradiating the information recording medium with a recording laser beam whose power can be adjusted; a controlling device for controlling the recording device to record calibration data by irradiating the information recording medium with the recording laser beam in which the power is adjusted gradually; a detecting device for detecting degree of modulation in an area in which the calibration data is recorded on the information recording medium every time the power is adjusted gradually by the control of the controlling device; an ending device for ending the irradiation of the recording laser beam by the control of the controlling device in a case where the degree of modulation detected by the detecting device exceeds a predetermined range; and a determining device for determining an optimum power for recording the information, on the basis of a reproduction signal obtained by reading the calibration data after the irradiation of the recording laser beam is ended by the control of the ending device.

The above object of the present invention can be also achieved by an information recording method provided with: a recording process of recording information onto an information recording medium by irradiating the information recording medium with a recording laser beam whose power can be adjusted; a controlling process of controlling the recording process to record calibration data by irradiating the information recording medium with the recording laser beam in which the power is adjusted gradually; a detecting process of detecting degree of modulation in an area in which the calibration data is recorded on the information recording medium every time the power is adjusted gradually by the control of the controlling process; an ending process of ending the irradiation of the recording laser beam by the control of the controlling process in a case where the degree of modulation detected by the detecting process exceeds a predetermined range; and a determining process of determining an optimum power for recording the information, on the basis of a reproduction signal obtained by reading the calibration data after the irradiation of the recording laser beam is ended by the control of the ending process.

The above object of the present invention can be also achieved by a computer program for making a computer function as: a recording device for recording information onto an information recording medium by irradiating the information recording medium with a recording laser beam whose power can be adjusted; a controlling device for controlling the recording device to record calibration data by irradiating the information recording medium with the recording laser beam in which the power is adjusted gradually; a detecting device for detecting degree of modulation in an area in which the calibration data is recorded on the information recording medium every time the power is adjusted gradually by the control of the controlling device; an ending device for ending the irradiation of the recording laser beam by the control of the controlling device in a case where the degree of modulation detected by the detecting device exceeds a predetermined range; and a determining device for determining an optimum power for recording the information, on the basis of a reproduction signal obtained by reading the calibration data after the irradiation of the recording laser beam is ended by the control of the ending device.

BRIEF DESCRIPTION OF DRAWINGS

FIG. 1 is a block diagram conceptually showing the basic structure of an example of the information recording apparatus of the present invention.

FIG. 2 is a flowchart conceptually showing an overall flow of an operation example of the recording apparatus of the present invention.

FIG. 3 is a block diagram conceptually showing the basic structure in a circuit example of a modulation degree detection circuit in the recording apparatus of the present invention.

FIG. 4 is a graph example showing a relation between a recording power and degree of modulation in the circuit example of the modulation degree detection circuit in the recording apparatus of the present invention.

FIG. 5 is a conceptual view showing the structure of a data recording area for judging that calibration data is recorded onto an information recording medium in the example of the information recording apparatus of the present invention.

DESCRIPTION OF REFERENCE CODES 101 spindle motor
102 optical pickup
103 control device
104 memory
105 information recording device
106 signal adjustment device
107 modulation degree detection device
108 information reproducing device
109 recording quality judgment device
201 modulation degree detection circuit
202 modulation degree memory
203 comparison circuit
204 reproduction signal
205 degree of modulation
206 previous degree of modulation
207 memory update timing
301 OPC area
302a, b unit OPC area
303 calibration area
304a, b determination area

BEST MODE FOR CARRYING OUT THE INVENTION

Hereinafter, as the best mode for carrying out the present invention, an explanation will be given on an information recording apparatus and method, and a computer program in embodiments of the present invention.

An embodiment of the information recording apparatus of the present invention is an information recording apparatus provided with: a recording device for recording information onto an information recording medium by irradiating the information recording medium with a recording laser beam whose power can be adjusted; a controlling device for controlling the recording device to record calibration data by irradiating the information recording medium with the recording laser beam in which the power is adjusted gradually; a detecting device for detecting degree of modulation in an area in which the calibration data is recorded on the information recording medium every time the power is adjusted gradually by the control of the controlling device; an ending device for ending the irradiation of the recording laser beam by the control of the controlling device in a case where the degree of modulation detected by the detecting device exceeds a predetermined range; and a determining device for determining an optimum power for recording the information, on the basis of a reproduction signal obtained by reading the calibration data after the irradiation of the recording laser beam is ended by the control of the ending device.

According to the embodiment of the information recording apparatus of the present invention, it is possible to record various content information including video information, music information, data information for computer, and the like.

Particularly in the embodiment, when the information recording apparatus irradiates the information recording medium with the recording laser beam to record the information, the controlling device records the calibration data by irradiating the information recording medium with the recording laser beam in which the power is adjusted gradually. Moreover, in the case where the degree of modulation detected by the detecting device exceeds the predetermined range, the ending device ends the irradiation of the recording laser beam for recording the calibration data by the controlling device. Then, on the basis of the recording quality, such as a jitter and degree of modulation, obtained from the reproduction signal detected by the irradiation of a reading laser beam (in other words, a reading signal obtained by reading the recorded calibration data), the determining device determines the optimum power of the laser beam when the information is recorded.

Here, the "calibration data" indicates test-writing data (e.g. OPC data or the like) recorded to determine the optimum power for recording the information. Moreover, the "optimum power" indicates the power of the recording laser beam that is most appropriate or almost appropriate for the recording of the information.

As a result, according to the embodiment of the information recording apparatus of the present invention, when the optimum power of the recording laser beam is determined (specifically, for example, in the OPC), the reproduction signal is detected by applying the reading laser beam after applying the recording laser beam, and the optimum power is determined on the basis of the detection result. In particular, in order to control the ending device to end the recording of the calibration data if the degree of modulation exceeds the predetermined range when the calibration data is recorded with the power of the recording laser beam changed gradually, as detailed later, it is possible to end the recording of the calibration data before the push-pull signal of the recorded calibration data reaches to an inappropriate level. Thus, without placing an unnecessary burden on the recording apparatus by performing the recording with an inappropriate power, or by omitting the process, the optimum power can be determined, safely and quickly. As a result, the information can be recorded with a more preferable power, and for example, a recording error and a reproduction error in the reproduction of the information can be reduced.

In one aspect of the embodiment, the case where the degree of modulation detected by the detecting device exceeds the predetermined range is a case where a push-pull signal estimated from the degree of modulation detected by the detecting device exceeds a reading limit level of the push-pull signal.

Here, the "push-pull signal" is a signal indicates the difference in the outputs from the respective divided detectors when the reading laser beam is irradiated to the information recording medium such as an optical disc, and the reproducing signal obtained from the returned light which is reflected and diffracted is detected by the divided detectors. By detecting the push-pull signal, tracking control or the like can be performed, and as a result, the information recorded on the information recording medium can be read. The intensity level of the push-pull signal is the highest in an unrecorded state, and it is reduced by recording the data. The reading limit level of the push-pull signal indicates the intensity level of the push-pull signal in which increasing the recording power causes a too small push-pull signal (i.e. too much difference from the amplitude of the push-pull signal in the unrecorded area), thereby making the tracking control unstable and thus making it hard or impossible to read the information recorded on the information recording medium.

Moreover, the degree of modulation is determined by the reflectance of the information recording medium, the power of the recording laser beam to be irradiated, and the like. The degree of modulation about the data recorded on one optical disc increases with an increase in the power of the recording laser beam. In other words, there is a mutual relation between the value of the degree of modulation and the intensity level of the push-pull signal, on the one optical disc. Here, if the reading limit level of the push-pull signal corresponding to the optical disc to be recorded on in advance, the calibration data can be recorded, with the power of the recording laser power changed in the range in which the recorded data can be read, by confirming the degree of modulation.

As a result, when the calibration data is recorded onto the information recording medium in this aspect, the calibration data can be recorded at the level that the push-pull signal does not interfere with the operation of the information recording apparatus.

In one aspect of the embodiment, the information recording medium allows reflectance to be increased when the information is recorded.

According to this aspect, in the information recording medium in the embodiment, the reflectance is increased by recording the information, and the amount of the returned light which is reflected with respect to the amount of the recording laser beam irradiated is increased.

Moreover, as an aspect of this information recording apparatus, the controlling device may control the recording device to record the calibration data by using the recording laser beam with one power and then record the calibration data by using the recording laser beam with another power, which is greater than or equal to the one power, when the power is adjusted gradually.

By virtue of such construction, by adjusting the amount of the recording laser beam from the low power side, it is possible to detect the limit level of the degree of modulation corresponding to the reading limit level of the push-pull signal in the adjustment process. As a result, it is possible to avoid such a situation that a failure in the detection of the push-pull signal interferes with a tracking operation due to the irradiation with a high power which exceeds the reading limit level of the push-pull signal from the beginning.

Moreover, by ending the recording of the calibration data at the time of detecting that the degree of modulation reaches to the limit level, it is unnecessary to record the calibration data in an unnecessary power range which is inappropriate for the recording of the information. Thus, it is possible to shorten the process of recording the calibration data for determining the optimum power.

Moreover, the controlling device may end the recording of the calibration data and then irradiate again an area on the information recording medium that is adjacent to an area in which the calibration data is recorded, with a power that is less than or equal to a power immediately before the recording of the calibration data is ended.

By virtue of such construction, it is possible to make a data recording area for judging that the calibration data is recorded in the area that is adjacent to the area in which the calibration data is recorded, and this facilitates the detection of an area in which the calibration data has not been recorded yet. In particular, if the calibration data is recorded to increase the power sequentially, it is likely hard to distinguish between the area with the calibration data recorded and the area that is adjacent to the aforementioned area and in which the calibration data has not been recorded yet, because the calibration data is recorded with the lowest power at the beginning. Thus, it is possible to clearly identify the edge of the area in which the calibration data is recorded, by performing the recording to be adjacent to the area in which the calibration data is recorded at the beginning, with the power that is less than or equal to the power immediately before the recording of the calibration data is ended (i.e. the highest power). The recording of the data for identifying the area with the calibration data recorded may be performed with a power that is less than or equal to the power when the calibration data is recorded last time and that can realize a detectable amplitude. Moreover, the recording may be performed not only with the same power but also with a plurality of powers.

In another aspect of the embodiment, the information recording apparatus is further provided with: a judging device for judging whether or not recording quality of the information recorded by using the recording laser beam with the optimum power determined by the determining device is at an acceptable level; and a modifying device for adjusting a recording pulse of the recording laser beam if it is judged that the recording quality is not at the acceptable level.

According to this aspect, when the information is recorded with the determined optimum power of the recording laser beam, if the recording quality of the information is not at the acceptable level, then, the recording quality of the information is corrected by adjusting the recording pulse.

Here, "adjusting the recording pulse" is adjusting either or both of the pulse width and pulse intensity of the pulse in the recording of the information including a pulse train. When the information is recorded by using the recording laser beam, the shape of a pit on the information recording medium formed by the irradiation of the recording laser beam is influenced not only by the power of the recording laser beam but also by the reflectance and sensitivity of the information recording medium. In the embodiment, the recording quality can be kept preferable by adjusting the recording pulse after the determination of the optimum power of the recording laser beam.

Alternatively, in an aspect in which the information recording apparatus is provided with the modifying device, the controlling device controls the recording device to record the calibration data again after the adjustment of the recording pulse of the recording laser beam on the modifying device.

By virtue of such construction, even if the optimum power in the information recording is changed by adjusting the recording pulse of the recording laser beam, it is possible to determine the optimum power after the change by recording the calibration data again.

In another aspect of the embodiment, the detecting device detects a difference between the degree of modulation in each power of the gradually adjusted recording power and the degree of modulation in a previous recording power of the gradually adjusted recording power when detecting the degree of modulation.

According to this aspect, the detecting device calculates and detects the difference between the degree of modulation in each recording power gradually adjusted and the degree of modulation in the previous recording power. As the recording power increases, the degree of modulation also increases; however, a rate of increase in the degree of modulation gradually decreases. In other words, in the relatively large recording power, a change in the degree of modulation with respect to the recording power is small, and when the value of the degree of modulation itself is seen, it is hard and mostly pointless to judge whether or not it reaches to a predetermined value. On the other hand, by checking the difference between the degree of modulation in one particular recording power and the degree of modulation in the previous recording power, it is possible to check the change in the degree of modulation with respect to the recording power. By virtue of the aforementioned construction, by checking whether or not the change in the degree of modulation reaches to the predetermined value there is such a remarkable effect that the state of the degree of modulation corresponding to the recording power can be seen in a more sensitive manner.

An embodiment of the information recording method of the present invention is an information recording method provided with: a recording process of recording information onto an information recording medium by irradiating the information recording medium with a recording laser beam whose power can be adjusted; a controlling process of controlling the recording process to record calibration data by irradiating the information recording medium with the recording laser beam in which the power is adjusted gradually; a detecting process of detecting degree of modulation in an area in which the calibration data is recorded on the information recording medium every time the power is adjusted gradually by the control of the controlling process; an ending process of ending the irradiation of the recording laser beam by the control of the controlling process in a case where the degree of modulation detected by the detecting process exceeds a predetermined range; and a determining process of determining an optimum power for recording the information, on the basis of a reproduction signal obtained by reading the calibration data after the irradiation of the recording laser beam is ended by the control of the ending process.

According to the embodiment of the information recording method of the present invention, it is possible to receive the same various effects as those of the aforementioned embodiment of the information recording apparatus of the present invention.

Incidentally, the embodiment of the information recording method of the present invention can also adopt the same various aspects in the embodiment of the information recording apparatus of the present invention described above.

An embodiment of the computer program of the present invention is a computer program for making a computer function as: a recording device for recording information onto an information recording medium by irradiating the information recording medium with a recording laser beam whose power can be adjusted; a controlling device for controlling the recording device to record calibration data by irradiating the information recording medium with the recording laser beam in which the power is adjusted gradually; a detecting device for detecting degree of modulation in an area in which the calibration data is recorded on the information recording medium every time the power is adjusted gradually by the control of the controlling device; an ending device for ending the irradiation of the recording laser beam by the control of the controlling device in a case where the degree of modulation detected by the detecting device exceeds a predetermined range; and a determining device for determining an optimum power for recording the information, on the basis of a reproduction signal obtained by reading the calibration data after the irradiation of the recording laser beam is ended by the control of the ending device.

According to the computer program of the present invention, the aforementioned embodiment of the information recording apparatus of the present invention can be relatively easily realized as a computer provided in the motion picture editing apparatus reads and executes the computer program from a program storage device, such as a ROM, a CD-ROM, a DVD-ROM, and a hard disk, or as it executes the computer program after downloading the program through a communication device.

Incidentally, in response to the various aspects in the embodiment of the information recording apparatus of the present invention described above, the embodiment of the computer program of the present invention can also adopt various aspects.

The operation and other advantages in the embodiment will become more apparent from the example explained below.

As explained above, according to the embodiment of the information recording apparatus of the present invention, it is provided with the recording device, the controlling device, the detecting device, the ending device, and the determining device. According to the embodiment of the recording method of the present invention, it is provided with the recording process, the controlling process, the detecting process, the ending process, and the determining process. According to the embodiment of the computer program of the present invention, it makes a computer function as the recording device, the controlling device, the detecting device, the ending device, and the determining device. Therefore, it is possible to provide an information recording apparatus and method which can preferably determine the optimum power when the data is recorded onto the information recording medium, such as an optical disc, and a computer program which makes a computer function as the information recording apparatus.

EXAMPLE

Structure Example

The structure example of the information recording apparatus in an example of the present invention will be explained with reference to FIG. 1. Incidentally, the same constituent elements in the drawings will carry the same referential numerals. FIG. 1 is a block diagram conceptually showing the basic structure of an example of the information recording apparatus of the present invention.

As shown in FIG. 1, an information recording apparatus 1 in the example is provided with a spindle motor 101, an optical pickup 102, a control device 103, a memory 104, an information recording device 105, a signal adjustment device 106, a modulation degree detection device 107, an information reproducing device 108, and a recording quality judgment device 109.

The optical pickup 102 is one specific example of the "recording device" of the present invention. The optical pickup 102 is provided with a semiconductor lens apparatus, various lenses, an actuator, and the like. More specifically, the optical pickup 102 irradiates an optical disc 100 with a laser beam L as reading light with a first power in reproduction. An obtained reproduction signal is passed to the information reproducing device 108 to reproduce the data. On the other hand, the optical pickup 102 irradiates the optical disc 100 with the laser beam L as writing light with a second power and with it modulated in recording. The power adjustment of the laser beam L is performed under the control of the signal adjustment device 106 which is one example of the "controlling device" described later. More specifically, the irradiation is performed with the laser beam L with a predetermined power by driving the semiconductor laser apparatus by a driving pulse defined by a predetermined pulse strategy.

The spindle motor 101 is constructed to rotate the optical disc 100 at a predetermined speed, under spindle servo provided by a not-illustrated servo circuit or the like. Moreover, the optical disc 102 is constructed to be displaced in the radial direction of the optical disc 100 or the like by the not-illustrated servo circuit or the like. As a result, various data can be recorded by applying the laser beam L at a desired recording position on the optical disc 100.

The signal recording device 105 is one example of the "controlling device" in the structure example of the present invention. The signal recording device 105 drives the semiconductor laser disposed in the optical pickup 102 in order to detect the optimum power of the laser beam by processes of recording and reproducing an OPC pattern described later, in an OPC process described later. After that, in the data recording, the signal recording device 105 is constructed to drive the semiconductor laser of the optical pickup 102 with the optimum power detected by the OPC process. In the data recording, the optimum power is modulated in accordance with record data.

The signal adjustment device 106 is constructed to output a signal indicating the OPC pattern to the information recording device 105 in the recording of the OPC pattern in the OPC process before a recording operation described later. The information recording device 105 passes the recording signal indicating the OPC pattern, to the optical pickup 102, by which the calibration data is recorded.

After the recording of the calibration data, the optical pickup 102 irradiates the optical disc 100 with a reading laser beam L, the returned light which is reflected and diffracted is passed to the modulation degree detection device 107, and the value of the degree of modulation is detected from the reproduction signal obtained from the returned light. Moreover, the optimum amount of light for data recording is determined from a jitter amount or the like included in the reproduction signal obtained from the returned light.

After the recording of the calibration data, the data recorded by using the laser beam L with the optimum power is reproduced. The recording quality judgment device 109 judges whether or not the recording quality of the reproduction signal passed to the information reproducing device 108 is at an acceptable level. If it is judged to be less than or equal to the acceptable level, the pulse strategy of the record data is adjusted on the signal adjustment device 106.

Incidentally, in the information recording apparatus 1 shown in FIG. 1, in order to give a simpler explanation on the characteristics of the example of the present invention, constituent features required for the structure example are extracted and illustrated. Thus, it is acceptable to provide the constituent features other than the aforementioned constituents.

Operation Example

Next, with reference to a flowchart in FIG. 2, an explanation will be given on the details of the OPC process of the information recording apparatus as constructed above.

When the optical disc 100 is loaded on the spindle motor 101, a seek operation is performed by the optical pickup 102 under the control of the control device 103, thereby obtaining various management data necessary for the recording process to be performed on the optical disc 100. On the basis of the management data, the data is recorded onto the optical disc 100 through the information recording device 105 in accordance with an instruction from external input equipment or the like, by the control of the control device 103. Then, the OPC process is performed as the calibration of the recording laser power before the recording of the data.

Firstly, identification is performed about whether or not the optical disc 100 loaded on the spindle motor 101 is a known disc (step S101). Here, the "known disc" indicates a disc in which the degree of modulation of the reproduction signal obtained when the disc is irradiated with the reading laser beam with one particular power. The degree of modulation of the reproduction signal obtained from the returned light includes an error depending on a state on the optical disc 100. In order to detect the degree of modulation accurately, it is necessary to identify the degree of modulation of the reproduction signal in the optical disc 100. Moreover, the degree of modulation in the same optical disc 100 is uniquely determined by the power of the recording laser beam L when the data is recorded, so it is associated with the amplitude of a push-pull signal uniquely determined likewise. Hence, if the acceptable limit value of the amplitude of the push-pull signal is determined which allows the record data to be read, the acceptable limit value of the degree of modulation corresponding to the acceptable limit value of the amplitude of the push-pull signal is also determined.

The identification method of the optical disc 100 includes, for example, a method of reading identification information recorded in a predetermined area on the optical disc 100, a method of irradiating the optical disc 100 with the laser beam L, detecting the reproduction signal corresponding to the returned light, and identifying the degree of modulation of the optical disc 100 on the basis of the reproduction signal obtained, and the like.

If the optical disc 100 is the known disc (the step S102: Yes), the acceptable limit value of the degree of modulation corresponding to the disc is read from the memory 104 and is set (step S103).

Moreover, if the optical disc 100 is not the known disc (e.g. if the optical disc 100 is a disc in which information associated with the reflectance of the disc is not identified) (the step S102: No), the acceptable limit value of the degree of modulation is newly set or the acceptable limit value of the degree of modulation of default is set, from the information obtained in the disc identification (the step S101) (step S104). Moreover, the identification information associated with the disc is recorded into the memory 104 at least in association with information about the acceptable limit value of the degree of modulation associated with the disc. Then, if the disc 100 having the same identification information is detected, the acceptable limit value of the degree of modulation recorded is read and set (the step S103).

Then, one particular power of the laser beam L for recording the calibration data is set by the signal adjustment device 106 (step S105).

Incidentally, in the example, it is assumed that the optical disc 100 in which the reflectance is increased by recording the data (i.e. by applying the laser beam L) (so-called L to H media) is used. In this case, the one particular power of the laser beam L set in the step S105 is the power of the laser beam L to the extent that does not exceed the amplitude limit value of the push-pull signal which allows the recorded information to be read and a relatively low power. Moreover, as detailed later, the calibration data is recorded with the power of the laser beam L increased sequentially, in the OPC process.

However, obviously, it may be constructed such that the optical disc 100 in which the reflectance is reduced by recording the data (i.e. by applying the laser beam L) is used. In other words, it is a case where the power of the laser beam L set in the step S105 is the power of the laser beam L to the extent that does not exceed the amplitude limit value of the push-pull signal which allows the recorded information to be read and a relatively high power. Moreover, in this case, the calibration data is recorded with the power of the laser beam L reduced sequentially, in the OPC process.

Then, the one particular power of the laser beam L is passed to the information recording device 105, and under the control of the information recording device 105, the calibration data is recorded onto the optical disc 100 with the one particular power (step S106).

If the recording of the calibration data with the one particular power in a predetermined area is ended, then, the degree of modulation of the reproduction signal in the area is obtained (step S107). The modulation degree detection device 107 calculates a difference in values between the obtained degree of modulation and the degree of modulation of the reproduction signal in an area recorded with a previous recording power, which is read from a modulation degree memory 202 in FIG. 3 detailed later. Moreover, the value of the degree of modulation is stored in the modulation degree memory 202 until a difference from at least next degree of modulation is calculated (refer to FIG. 4).

Then, it is judged whether or not the calculated difference value of the degree of modulation exceeds the acceptable limit value of the degree of modulation which is set (step S108).

If the degree of modulation does not exceed the acceptable limit value (the step S108: No), the control device 103 is notified of the result by the modulation degree detection device 107, and the information recording device 105 increases the power of the recording laser beam L under the control of the control device 103 which is notified of the result (step S109). When the power of the recording laser beam L is increased, a predetermined amount may be used for the increase amount in one operation. After the power of the laser beam L is increased, the recording of the calibration data is performed again with the power (step S106).

On the other hand, if the degree of modulation does not exceed the acceptable limit value (the step S108: Yes), the control device 103 is notified of the result by the modulation degree detection device 107, and the information recording device 105 ends the recording of the calibration data under the control of the control device 103 (step S110). According to this operation, when or before it becomes hard or impossible to read the information recorded on the optical disc 100 due to a too small push-pull signal, the recording of the calibration data can be ended. As a result, it is possible to achieve such a marked effect that the calibration data can be stably recorded by not performing the recording in an area which allows an excess of the reading limit level of the push-pull signal.

After the end of the recording, the power of the laser beam L used in an area which provides the smallest jitter amount in the reproduction signal in an area on the optical disc 100 in which the calibration data is recorded by adjusting the power gradually is determined as the optimum power (step S111). Specifically, the optimum power is determined by detecting the jitter amount from the reproduction signal obtained by irradiating the area in which the calibration data is recorded, with the reading laser beam L. The process of detecting the jitter amount may be performed on the entire area after the recording of the calibration data is ended. Alternatively, in the process of detecting the push-pull amplitude in each power, the jitter amounts in the powers may be detected simultaneously, stored in the memory 104, and compared later. For example, an error rate, degree of modulation, or asymmetry may be used as an index, instead of the jitter amount.

It may be or may not be also constructed such that the recording compensation process in which the pulse strategy of the data for recording is adjusted to achieve the appropriate recording quality is performed after the optimum power is determined. In the recording compensation process, firstly, the data is recorded by using the laser beam L with the optimum power, and at the same time, the recorded data reproduced, and the reproduction signal is passed to the information reproducing device 108 (step S112). Then, it is judged on the recording quality judgment device 109 whether or not the recording quality of the data is at the acceptable level (step S113). If the judgment result does not achieve the acceptable level of the recording quality (the step S113: No), the correction of the pulse strategy (e.g. the correction of at least one of the pulse width and the amplitude of the pulse strategy) is performed on the signal adjustment device 106 (step S114). Incidentally, if a change in the amplitude of the pulse strategy changes the power of the laser beam L, resulting in a change in the condition of the optimum power (step S115: Yes), then, the calibration data is recorded again (the step S106), and the optimum power is obtained again.

According to this operation, the pulse strategy of the data for recording is corrected on the basis of the determination of a pit shape formed by actually recording the data or the like, so that it is possible to keep the optimum recording quality of the data. Moreover, if the condition for determining the optimum power is changed due to the correction of the pulse strategy, then, the pulse strategy after the correction is used to obtain the optimum power again, by which the marked effect which keeps the preferable recording quality can be obtained.

If the recording quality of the data is within the acceptable level (the step S113: Yes), or if there is no need to obtain the optimum power again after the correction of the pulse strategy (the step S115: No), the determined optimum power and pulse strategy are stored into the memory 104, and the data is recorded on the basis of the optimum power and the pulse strategy under the control of the control device 103.

Examples of Modulation Degree Detection Circuit

Next, with reference to FIG. 3 and FIG. 4, an explanation will be given on the details of the detection of the degree of modulation in the example (i.e. the modulation degree detection device 107). FIG. 3 shows the example of the modulation degree detection device 107 in the example, wherein FIG. 3 is a block diagram showing the basic structure of a circuit for detecting the difference value between the degree of modulation in a particular recording power and the degree of modulation in a previous recording power. FIG. 4 is a graph example showing a relation among the degree of modulation of the reproduction signal detected in an OPC area, the difference value between the degree of modulation in the particular recording power and the degree of modulation in the previous recording power, the amplitude of the push-pull signal detected in the OPC area, and the jitter amount included in the reproduction signal detected in the OPC area.

The modulation degree detection circuit 107 in the circuit example shown in FIG. 3 is provided with a modulation degree detection circuit 201, a modulation degree memory 202, and a comparison circuit 203.

By the control of the optical pickup 102 in FIG. 1, a reproduction signal 204 is inputted to the modulation degree detection device 107 when the calibration data recorded on the optical disc 100 is read.

Then, on the modulation degree detection circuit 201, the degree of modulation of the reproduction signal 204 is detected and sent to the comparison circuit 203. A previous degree of modulation 206 detected from the reproduction signal in the OPC area recorded with the previous recording power is also sent from the modulation degree memory 202 to the comparison circuit 203. Moreover, in response to an instruction of modulation degree memory update timing 207 from the control device 103, a degree of modulation 205 sent from the modulation degree detection circuit 201 is stored into the modulation degree memory 202, and the previous degree of modulation 206 is updated.

On the comparison circuit 203, a difference between the degree of modulation 205 and the previous degree of modulation 206 is calculated and outputted to the control device 103. Then, on the control device 103, it is judged whether or not the difference exceeds the acceptable limit value of the degree of modulation.

With reference to the graph example shown in FIG. 4, an explanation will be given on the method of estimating the push-pull signal level using the degree of modulation of the reproduction signal. The upper part of the graph shows the degree of modulation 205 of the reproduction signal with respect to the recording power of the recording laser beam L, the difference value between the degree of modulation 205 and the previous degree of modulation 206, the amplitude of the push-pull signal detected in the OPC area, and the jitter amount included in the reproduction signal detected in the OPC area (i.e. a shift amount in a time axis direction of the recording pulse). As shown in FIG. 4, as the power increases, the degree of modulation 205 increases, but its increase amount decreases as shown by the difference in degree of modulation, and the value of the push-pull amplitude also decreases.

An operation of calibrating the power by the OPC using this circuit example will be explained. Firstly, in the calibration of the power by the OPC, starting from a power low enough to obtain the push-pull signal level which is at least greater than or equal to a detectable limit value, the recording of the calibration data with one particular power is performed, and then, the degree of modulation of the reproduction signal in the area in which the calibration data is recorded is detected, as shown in the lower part of FIG. 4. In the recording and detecting processes, the recording is performed with the recording power increased sequentially and gradually, until the difference value between the degree of modulation and the previous degree of modulation in the previous recording power exceeds the acceptable limit value of the degree of modulation (the step S103 to the step S106 in FIG. 2). The process of recording the calibration data is ended when the detected difference value of the degree of modulation exceeds the acceptable limit value of the degree of modulation (the step S107 in FIG. 2).

Then, in the area in which the calibration data is recorded, a value which provides the smallest jitter amount is determined as the optimum power (the step S108 in FIG. 2). According to this operation, it is possible to determine the optimum power which provides the smallest jitter amount while recording the calibration data in the range that does not exceed the detection limit of the push-pull signal level.

Example of Judgment of Calibration Area

By using FIG. 5, an explanation will be given on an operation of forming a data recording area for judging that the calibration data is recorded on the information recording medium. FIG. 5 is a conceptual view showing an information recording area when the calibration data is recorded onto an OPC area 301 on the optical disc 100. As shown in FIG. 5, an OPC area 302 in which the calibration data is recorded on the optical disc 100 is provided with a calibration area 303 in which the calibration data is recorded; and a judgment area 304 which is adjacent to the area with the calibration data recorded and in which judgment data is recorded, wherein the judgment data indicates that the calibration data is recorded (in other words, the judgment data indicates a boundary between the area with the calibration data recorded and an area with no calibration data recorded).

Next, an explanation will be given on the operation of recording the calibration data and the judgment data. Firstly, in the OPC area 301 of the optical disc 100 shown in FIG. 5, an unused area in which the data is not recorded is sought from a front edge in a spiral direction (hereinafter simply referred to as the front edge) to a rear edge. If no data is recorded on the OPC area 301, i.e. if the OPC is performed for the first time, the rearmost edge of the OPC area 301 is sought.

The recording of the calibration data into the sought unused area is performed on a certain area from the front edge side of the OPC area 301.

The size of the area may be determined in advance, and it is set not to exceed the rear edge of the recording area. Moreover, in the example, the recording of the calibration data is performed from the low power side, and the power increases sequentially and gradually as the recording proceeds to the rear edge side. Incidentally, in the calibration area 303 (or a judgment area) in FIG. 5, the recorded data is shown by a monotone drawing which becomes relatively dark as the recording is performed with a relatively high power.

If the recording of the calibration data is ended, then, as shown in the middle part of FIG. 5, the judgment data is recorded into the unused area which is adjacent to the front edge side of the calibration area 303, with a power that is lower than the power when the recording of the calibration data is ended and that allows the recorded area to be detected by the information reproducing device 108. The recording of the judgment data is performed from the front edge side of the OPC area 301 to the rear edge side in order not to overlap the calibration area 303. At this time, there may be a space left in which the data is not recorded between the calibration area 303 and the judgment area 304. The calibration area 303 generated by the recording and a judgment area 304a in which the judgment data is recorded are collectively referred to as a unit OPC area 302a. Incidentally, the unit OPC area 302a indicates, in effect, an area in which the calibration data is recorded by one OPC. The aforementioned OPC area 301 preferably has a size large enough to be provided with a plurality of unit OPC areas 302a therein.

Moreover, in the recording of the judgment data, it is only necessary to satisfy such conditions that the power is lower than the power when the recording of the calibration data is ended and that the power allows the recorded area to be detected by the information reproducing device 108. For example, as shown in the lower part of FIG. 5, not only the recording with the same power but also the recording with the recording power changed may be performed. At this time, in the example, the recording is performed from the high power side, and the power decreases sequentially and gradually as the recording proceeds to the rear edge side. The judgment area 304b is one example of the above situation, and the recording is performed with a power that is lower than the power when the recording of the calibration data is ended and with the power reduced sequentially.

As described above, in recording the calibration data, the unused area is sought from the front edge of the OPC area 301 to the rear edge. Here, if the calibration data is recorded multiple times on one optical disc 100, then, the next calibration data is recorded on the front edge side of the firstly detected judgment area 304a because the judgment area 304a always exists on the rearmost edge of the unrecorded area on the OPC area 301.

According to the operations, it is possible to make the judgment areas 304a and 304b for judging that the calibration data is recorded, in the area adjacent to the calibration area 303, which facilitates the detection of the area in which the calibration data has not been recorded. In particular, if the calibration data is recorded in order to increase the power sequentially, it is likely hard to distinguish between the generated calibration area 303 and the unused area adjacent to the calibration area 303 because the calibration data is recorded with the lowest power at the beginning. Thus, it is possible to clearly identify the edge of the area in which the calibration data is recorded, by performing the recording to be adjacent to the area in which the calibration data is recorded at the beginning, with the power that is less than or equal to the power immediately before the recording of the calibration data is ended (i.e. the highest power). This effect is remarkable when the OPC process is performed multiple times.

The present invention is not limited to the aforementioned examples, but various changes may be made, if desired, without departing from the essence or spirit of the invention which can be read from the claims and the entire specification. An information recording medium, an information recording apparatus and method, and a computer program for recording control, all of which involve such changes, are also intended to be within the technical scope of the present invention.

The invention claimed is:

1. An information recording apparatus comprising:
    a recording device for recording information onto an information recording medium by irradiating the information recording medium with a recording laser beam whose power can be adjusted;
    a controlling device for controlling the recording device to record calibration data by irradiating the information recording medium with the recording laser beam in which the power is adjusted gradually;
    a detecting device for detecting degree of modulation in an area in which the calibration data is recorded on the information recording medium every time the power is adjusted gradually by the control of the controlling device;
    an ending device for ending the irradiation of the recording laser beam by the control of the controlling device in a case where the degree of modulation detected by the detecting device exceeds a predetermined range; and
    a determining device for determining an optimum power for recording the information, on the basis of a reproduction signal obtained by reading the calibration data after the irradiation of the recording laser beam is ended by the control of the ending device,
    wherein the case where the degree of modulation detected by the detecting device exceeds the predetermined range is a case where a push-pull signal estimated from the degree of modulation detected by the detecting device exceeds a reading limit level of the push-pull signal.

2. The information recording apparatus according to claim 1, wherein the information recording medium allows reflectance to be increased when the information is recorded.

3. The information recording apparatus according to claim 1, wherein the controlling device controls the recording device to record the calibration data by using the recording laser beam with one power and then record the calibration data by using the recording laser beam with another power, which is greater than or equal to the one power, when the power is adjusted gradually.

4. The information recording apparatus according to claim 3, wherein the controlling device ends the recording of the calibration data and then irradiates again an area on the information recording medium that is adjacent to an area in which the calibration data is recorded, with a power that is less than or equal to a power immediately before the recording of the calibration data is ended.

5. The information recording apparatus according to claim 1, further comprising:
    a judging device for judging whether or not recording quality of the information recorded by using the recording laser beam with the optimum power determined by the determining device is at an acceptable level; and
    a modifying device for adjusting a recording pulse of the recording laser beam upon it being judged that the recording quality is not at the acceptable level.

6. The information recording apparatus according to claim 5, wherein the controlling device controls the recording device to record the calibration data again after the adjustment of the recording pulse of the recording laser beam on the modifying device.

7. The information recording apparatus according to claim 1, wherein the detecting device detects a difference between the degree of modulation in each power of the gradually adjusted recording power and the degree of modulation in a previous recording power of the gradually adjusted recording power when detecting the degree of modulation.

8. An information recording method comprising:
    a recording process of recording information onto an information recording medium by irradiating the information recording medium with a recording laser beam whose power can be adjusted;
    a controlling process of controlling the recording process to record calibration data by irradiating the information recording medium with the recording laser beam in which the power is adjusted gradually;
    a detecting process of detecting degree of modulation in an area in which the calibration data is recorded on the information recording medium every time the power is adjusted gradually by the control of the controlling process;
    an ending process of ending the irradiation of the recording laser beam by the control of the controlling process in a case where the degree of modulation detected by the detecting process exceeds a predetermined range; and
    a determining process of determining an optimum power for recording the information, on the basis of a reproduction signal obtained by reading the calibration data after the irradiation of the recording laser beam is ended by the control of the ending process,
    wherein the case where the degree of modulation detected by the detecting process exceeds the predetermined range is a case where a push-pull signal estimated from the degree of modulation detected by the detecting process exceeds a reading limit level of the push-pull signal.

9. A non-transitory computer-readable medium with a computer program recorded thereon for tangibly embodying a program of instructions executable by a computer for making the computer function as:
    a recording device for recording information onto an information recording medium by irradiating the information recording medium with a recording laser beam whose power can be adjusted;
    a controlling device for controlling the recording device to record calibration data by irradiating the information recording medium with the recording laser beam in which the power is adjusted gradually;

a detecting device for detecting degree of modulation in an area in which the calibration data is recorded on the information recording medium every time the power is adjusted gradually by the control of the controlling process;

an ending device for ending the irradiation of the recording laser beam by the control of the controlling device in a case where the degree of modulation detected by the detecting device exceeds a predetermined range; and a determining device for determining an optimum power for recording the information, on the basis of a reproduction signal obtained by reading the calibration data after the irradiation of the recording laser beam is ended by the control of the ending device, wherein the case where the degree of modulation detected by the detecting device exceeds the predetermined range is a case where a push-pull signal estimated from the degree of modulation detected by the detecting device exceeds a reading limit level of the push-pull signal.

* * * * *